(12) United States Patent
Gottwald

(10) Patent No.: US 7,840,140 B2
(45) Date of Patent: Nov. 23, 2010

(54) METHOD AND ARRANGEMENT FOR FORMING A TRANSMITTER-SIDE TRANSMISSION SIGNAL

(75) Inventor: Erich Gottwald, Holzkirchen (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 692 days.

(21) Appl. No.: 11/885,579

(22) PCT Filed: Feb. 17, 2006

(86) PCT No.: PCT/EP2006/060046

§ 371 (c)(1),
(2), (4) Date: Sep. 4, 2007

(87) PCT Pub. No.: WO2006/094891

PCT Pub. Date: Sep. 14, 2006

(65) Prior Publication Data

US 2008/0138090 A1     Jun. 12, 2008

(30) Foreign Application Priority Data

Mar. 7, 2005  (DE) .................. 10 2005 010 864

(51) Int. Cl.
*H04B 10/04* (2006.01)
*H04B 10/12* (2006.01)
(52) U.S. Cl. ..................................................... 398/193
(58) Field of Classification Search .............. 398/193, 398/194
See application file for complete search history.

(56) References Cited

U.S. PATENT DOCUMENTS

| 7,173,551 | B2 * | 2/2007 | Vrazel et al. ............... 341/144 |
| 2004/0067064 | A1 | 4/2004 | McNicol et al. |
| 2004/0197103 | A1 | 10/2004 | Roberts et al. |

FOREIGN PATENT DOCUMENTS

| EP | 0 654 193 | 1/1997 |
| WO | WO 2004/032385 A1 | 4/2004 |

OTHER PUBLICATIONS

Von Koch et al., "Dispersion Compensation by Active Predistorted Signal Synthesis", Journal of Lightwave Technology, Aug. 1985, pp. 15-20, vol. LT-3, No. 4.

* cited by examiner

*Primary Examiner*—Shi K Li
(74) *Attorney, Agent, or Firm*—Laurence A. Greenberg; Werner H. Stemer; Ralph E. Locher

(57) ABSTRACT

A transmitter-side transmission signal for compensating disturbances caused by e transmission properties of an optical transmission system is provided. A high-bit-rate-binary signal is serially introduced into an N-level-shift register. A bit pattern whose bit number depends on the transmission system disturbance influence is removed from the shift register and introduced into comparators connected to comparative-value registers. The comparative-value registers include values received from a transmission function and from various binary-bit patterns. In the comparators, the binary-bit pattern introduced is converted into a binary combination which is introduced into a digital-analog transducer, which transmits a compensation signal, corresponding to a discrete value for the amplitude or phase of the transmission signal corresponding a desired signal form, to a modulator. For bit pattern whose bit number is <=10 a code conversion is carried out a bit-data rates transmitted while the comparative-value registers of the comparators subsist with substantially slow storage elements.

9 Claims, 4 Drawing Sheets

METHOD AND ARRANGEMENT FOR FORMING A TRANSMITTER-SIDE TRANSMISSION SIGNAL

CROSS REFERENCE TO RELATED APPLICATIONS

This application is the US National Stage of International Application No. PCT/EP2006/060046, filed Feb. 17, 2006 and claims the benefit thereof. The International Application claims the benefits of German application No. 102005010864.4 DE filed Mar. 7, 2005, both of the applications are incorporated by reference herein in their entirety.

FIELD OF INVENTION

The invention relates to a method and an arrangement as claimed in the independent claims.

BACKGROUND OF INVENTION

High bit rate digital optical transmission systems with standard glass fibers are predominantly used at present for long-range information transmission. In such cases linear and non-linear effects in the transmission fibers and system components limit the signal transmission range. The chromatic dispersion of the glass fibers in particular, also referred to as group velocity dispersion, abbreviated to GVD, results, as the data rate increases, in signal distortion and therefore shorter transmission ranges, if no measures are taken to compensate for dispersion. Non-linear effects, such as self-phase modulation, abbreviated to SPM, also cause signal distortion.

One option for compensating for such interference due to linear and non-linear effects consists of generating a predistorted signal on the transmit side of the transmission link, so that after propagation of the signal the interference on the link is eliminated on the receive side and the required signal form is present. This technique was first proposed by Koch et al. in the publication "Dispersion compensation by active predistorted signal synthesis", Journal of Lightwave Technology, vol. LT-3, no. 4, August 1985. The patent document EP 0 654 193 dated 1993similarly refers to a pre-emphasis measure based on electrical pretreatment of the data signal, wherein both the optical amplitude and respectively output and the phase or frequency of the lightwave are modulated on the transmit side in such a manner that a practically undistorted data signal is present at the end of the dispersive transmission link.

In the patent publication WO2004/032385 A1 (hereafter referred to as document D1) and the US patent application with the publication number 2004/0067064 A1, arrangements are proposed for electrical precompensation for distortion caused by dispersion on an optical transmission link. The arrangements contain a processor component for precompensation 10, in which a digital filter 19, a digital/analog converter 22 and optionally also other filter arrangements are connected in series. In D1 the digital filter is realized from a serial to parallel converter (SPC) and a random access memory look-up table (RAM LUT). The digital filter is used to convert the uniquely distinguishable bit sequences of a data signal to a predistorted signal for compensation purposes according to a predetermined specification. This compensation signal is then supplied to a modulator. When the distortion of a transmission signal is caused by dispersion, each bit is influenced by its adjacent bits. The number of adjacent bits to be taken into account is less than 20 (or ±10) at 10 Gb/s and with standard single-mode fibers in the 1.5 μm wavelength range. The data signal is fed into an N-stage SPC, such as a shift register for example. The bit pattern, which is then present at the N pick-offs, is used as the address for the high-speed memory RAM-LUT of capacity $2^N$. Every address leads to a memory location, in which an associated value, calculated from the transmission function of the fiber section, is stored. The value associated with the respective address is then used in the (single or multiple) data clock pulse by way of a high-speed D/A converter and an amplifier to activate the I/O converter.

One disadvantage of this realization is that there are at present no RAMs, which can be read at the data rate of at least 10 Gbit/s and preferably higher than 20 to 40 Gbit/s. Also all possible data values that are a function of the bit pattern have to be stored, corresponding to $2^N$ combinations.

SUMMARY OF INVENTION

The object of the invention is to specify a method which allows a technical realization for generating any pre-emphasis even at high data rates. An arrangement suitable for this purpose is also to be specified.

These objects are achieved by methods and by an arrangement as claimed in the independent claims.

According to the invention the current bit pattern taken from a shift register in a parallel manner is supplied to a number of comparators, in which a comparison takes place with predetermined comparison values. The comparison values are generated as a function of a compensation function in a comparison value register and can therefore be adjusted. They are a function of the respective structure of a transmission link and therefore take into account the influence of interference effects. In the comparators the current bit pattern is transcoded into a bit combination which corresponds to the digital value of the compensation signal. The advantage of the inventive method is that comparators are very fast and can handle data rates of more than 40 Gbit/s. In contrast the comparison values in the comparison value register are quasi-static. When incorporated into a regulating process, updating at clock pulse rates below 1 MHz is generally totally adequate, so the demands on memory speed are very small. The discretization or number of stages of the D/A converter is also independent of the length of the current bit pattern, in other words the system can be adapted in any manner. However a discretization of more than $2^4$ is no longer expedient, as amplifiers and modulators only operate in a linear manner to a limited degree. Overall the electrical pre-emphasis method with the inventive variant of its realization has a major commercial advantage, since significant costs are saved by dispensing with the dispersion-compensating fibers (DCFs) within the transmission link. In particular the absence of DCFs would simplify the optical amplifier arrangements. Since the DCFs are generally inserted between the second and third amplifier stages, the absence of DCFs, which might also be associated with the absence of an amplifier stage, would allow improvements to be achieved in respect of the damping, dynamic characteristics and noise characteristics of the amplifiers.

In an advantageous variant the bit pattern taken from the shift register in parallel is supplied to two or more comparator sets, each consisting of a number of comparators. If switching is effected between these comparator sets at least double the bit clock pulse rate, at least two temporally successive bit combinations or compensation signals are generated per bit clock pulse interval. The resolution of the method is increased in this manner. While a scan rate of one bit per bit clock pulse on the receive side results in an eye-opening penalty (EOP) of around 3 dB, the EOP decreases to around 0.4 dB with four scan points per bit interval, which means that the transmission quality improves significantly. In contrast no further substantial improvements in transmission quality occur with more than four scan points.

In a further variant the transcoded bit combination generated in a first comparator set is used in the modulator to control the amplitude of the transmission signal and the transcoded bit combination generated in a second comparator set is used in the modulator to control the phase of the transmission signal. If only one compensation signal is generated for the amplitude, there may be an improvement in transmission quality but a phase inversion by means of a predistorted phase signal is essential for total equalization.

In a further advantageous variant electronic propagation time elements are used instead of a shift register. These are integrated into the data stream in a serial manner and the bits are picked off in a parallel manner in the intermediate spaces. If electronic propagation time elements are used with infinitely adjustable propagation time, it is possible to adapt infinitely to any data rates or clock pulse rates. Using different error-correcting codings means that the typical clock pulse rates are between 9.956 and 12.6 GHz for a data rate of approximately 10 Gbit/s.

Further advantageous variants of the invention are set out in the dependent claims.

BRIEF DESCRIPTION OF THE DRAWINGS

The invention is described in more detail below with reference to an exemplary embodiment.

DETAILED DESCRIPTION OF INVENTION

Figure 1:
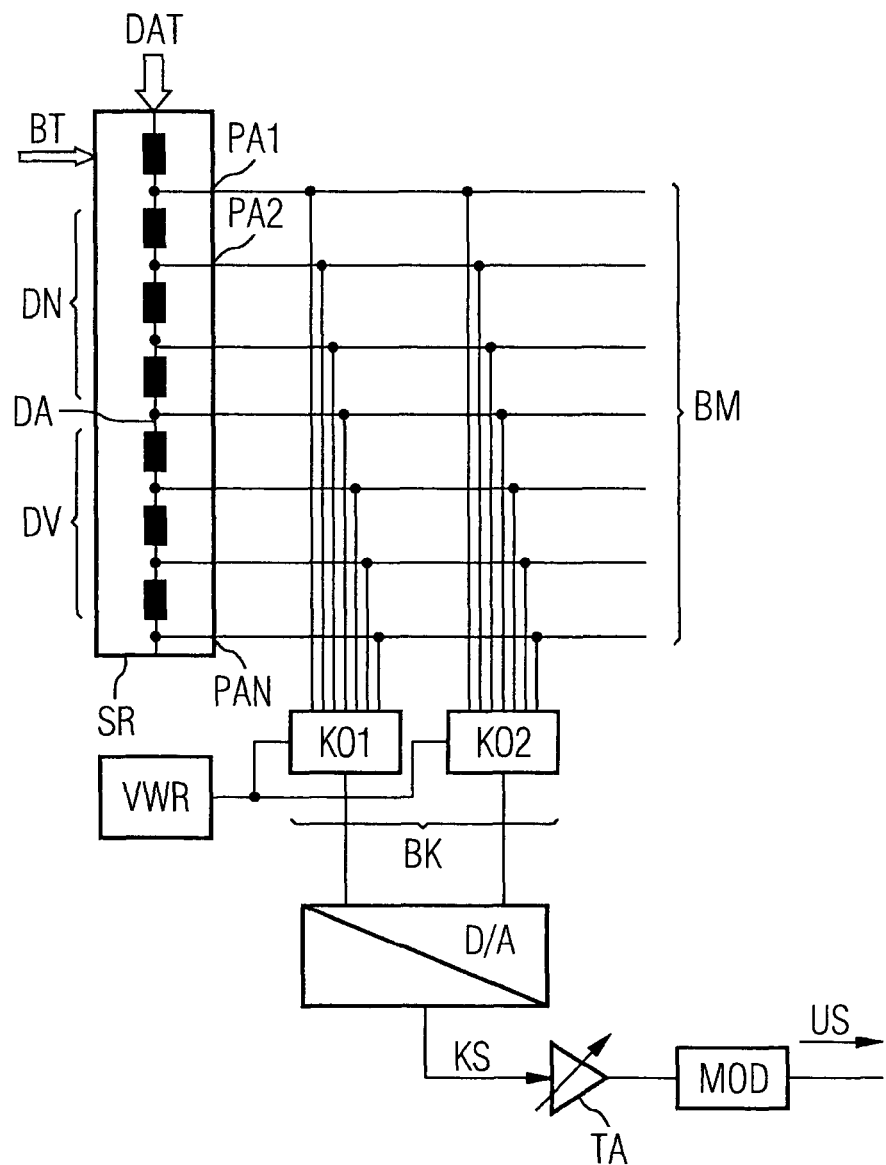
FIG. 1 shows a circuit arrangement of the inventive transcoder for electrical pre-emphasis

FIG. 1 shows a circuit arrangement of the inventive transcoder for electrical pre-emphasis. It is disposed on the transmit side. The digital data DAT is supplied in a serial manner to a preferably clocked shift register SR. The data is pushed bit-by-bit with clock pulse BT through the shift register. The individual bits are picked off in a parallel manner per bit clock pulse at the parallel outputs PA1 to PAN. The bit pattern BM taken out in a parallel manner thus consists of a bit to be transmitted DA and the adjacent bits DV and DN. The number of bits is a function of the disruptive influences of the transmission system, since more or fewer adjacent bits of the data bit to be transmitted are affected for example as a function of the dispersion value. The number of maximum affected adjacent bits is a function of the dispersion to be compensated for as a maximum. The bit pattern BM, which comprises for example N bits, is then supplied to the comparators (KO1, KO2, . . . ). The comparators (KO1, KO2, . . . ) are also connected respectively to a comparison value register VWR. The comparison values (VW1, VW2, . . . ) of a transmission-specific reference set are stored there. The comparison values are calculated respectively from predetermined possible bit patterns and the inverse transmission function $(H(\omega)^{-1}=T^{-1})$. The comparison values therefore contain all the information about the transmission link and the interference caused by transmission. They can optionally also be stored in a table but should be interchangeable in any manner, to ensure that they can be adapted to any transmission link. The comparison values are supplied respectively to a separate input of the comparators. The comparators supply a logical 1 at their output, if one of the comparison values stored there corresponds to the bit pattern present. Otherwise they supply a zero value. The outputs of the comparators are connected to the inputs of a digital/analog converter D/A. The bit pattern combination BK resulting from the comparators is converted in the digital/analog converter D/A to an analog signal, the actual compensation signal KS, and the compensation signal KS is optionally supplied to the modulator MOD after amplification in an amplifier TA.

Figure 2:
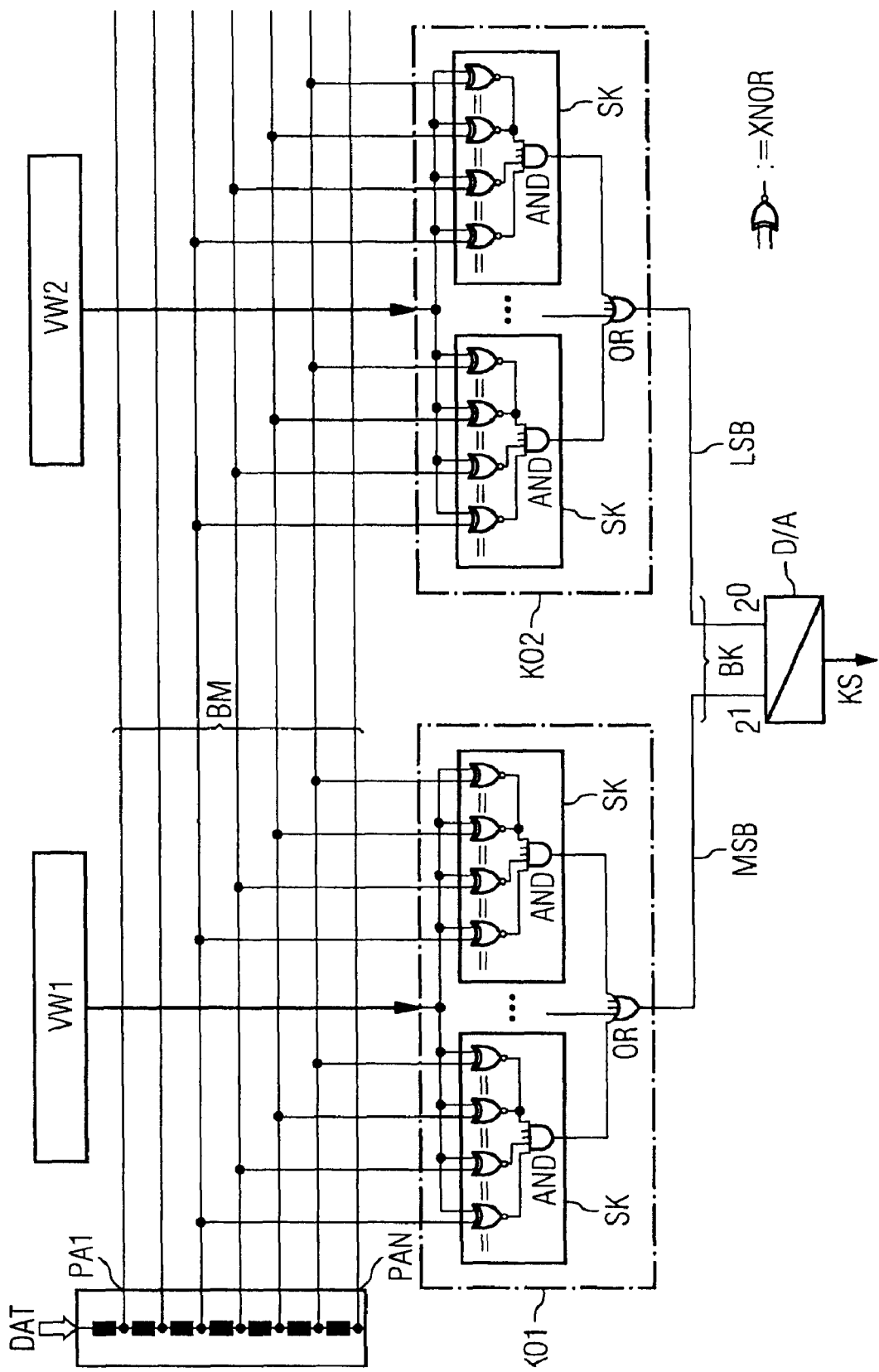
FIG. 2 shows a circuit arrangement according to FIG. 1 with a detailed view of the comparator switching circuits

A specific example of the inventive method is given with reference to FIG. 2.

To design the pre-emphasizer the inverse transmission function $T^{-1}$ of the fibers or system is first calculated, optionally including the inverse transmission function of the modulator and miscellaneous amplifiers. The output signal at the receiver for a maximum dispersion value is then simulated for a random bit sequence of adequate length. The pattern of the amplitude thus obtained and the phase of the distorted output signal are each discretized according to the degree of distortion. If the discretization is 4 ($=2^2$) stages for example, K=2 comparators are required. (In the case of 8 ($=2^3$) stages, it would be K=3 comparators, etc.).

In the example being dealt with here a bit pattern of length N=4 is to be converted to a four-stage compensation signal (with the values 0, 1, 2 and 3). The binary bit patterns are transcoded to the analog values listed alongside in the assignment table below:

| | |
|---|---|
| 0000 -> | 0 |
| 0001 -> | 1 |
| 0010 -> | 3 |
| 0011 -> | 2 |
| 0100 -> | 0 |
| 0101 -> | 0 |
| 0110 -> | 1 |
| 0111 -> | 1 |
| 1000 -> | 2 |
| 1001 -> | 2 |
| 1010 -> | 3 |
| 1011 -> | 3 |
| 1100 -> | 3 |
| 1101 -> | 0 |
| 1110 -> | 1 |
| 1111 -> | 2 |

Figure 4:
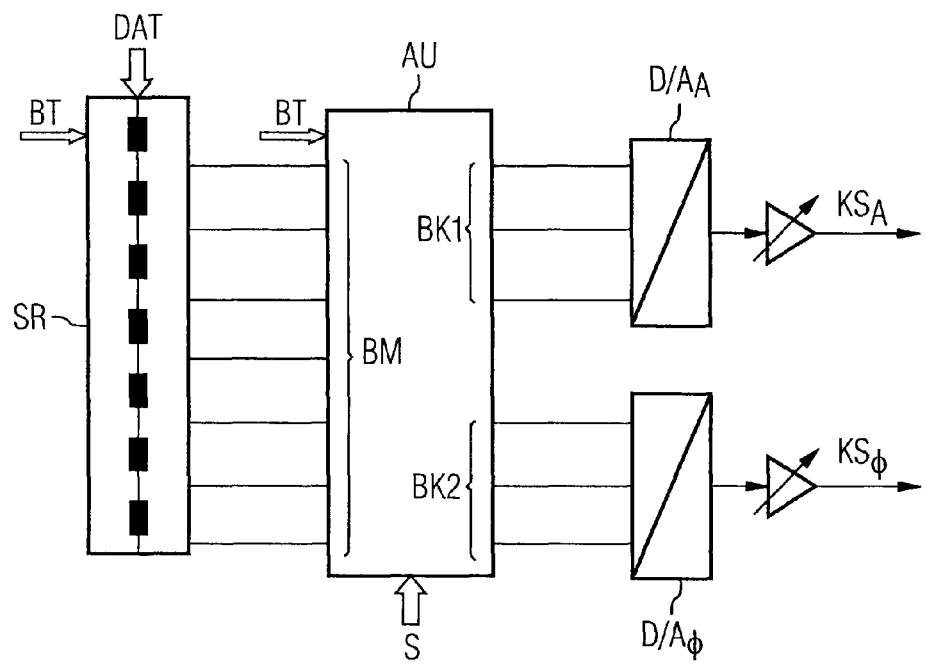
FIG. 4 shows a circuit arrangement of a general transcoder with two outputs to control the amplitude and phase of a transmission signal.

A bit pattern taken from the parallel outputs PA1 to PAN is supplied bit-by-bit to the inputs of the comparator. The individual comparator inputs are connected to a first input of individual XNOR gates. In the circuit arrangement given by way of example in FIG. 2 4 comparator inputs respectively are connected to one XNOR gate respectively. The second input of each XNOR gate is connected to the comparison value register VWR. The outputs of four XNOR gates respectively are connected to the inputs of an AND gate. The switching circuits SK, made up of four XNOR gates and one AND gate in this example, carry out one comparison respectively per clock pulse between the supplied bit pattern BM and a comparison value VW. The number of switching circuits SK per comparator is a function of the number of comparison values in the associated comparison value registers. The comparison values VW are determined with the aid of the inverse transmission function $T^{-1}$ and the $2^N$ possible bit patterns and are combined into reference sets. In the example given the following reference sets are stored in the comparison value registers:

In VW1 the reference set
{0001;0110;0111;1110;0010;1010;1011;1100} is stored.
In VW2 the following comparison values are given:
{0011;1000;1001;1111;0010;1010;1011;1100}. There are therefore 8 switching circuits SK in each comparator, in which switching circuits respectively a comparison is carried out. The outputs of each individual switching circuit SK are connected to the inputs of an OR gate. If one of the bit patterns present at the inputs of the comparators corresponds to a comparison value, one of the switching circuits SK supplies a logical one, which is also present at the output of the comparator due to the subsequent OR operation. The output of comparator KO1 is the most significant bit (MSB) in this example, while the output of comparator KO2 is the least significant bit (LSB). By way of example the bit pattern 1010 is to be taken from the shift register in a parallel manner. The bit pattern is an element of both reference sets of the comparison value register. There are therefore logical ones present at the outputs of both comparators and these are supplied to the digital/analog converter D/A. The converts the bit combination received (in this instance 11) to the associated analog value (in this instance 3). This allows every assignment from the assignment table given above to be achieved.

Due to the transcoding of a bit pattern BM of length N to a bit combination BK of length M using the inventive comparator circuit, in contrast to the RAM-LUT used in D1 there are no longer $2^N$ memory locations in the comparison value register. Instead of the function values of the compensation function associated with a specific bit pattern or address as in D1, here only those comparison values are stored, which result in a predefined value of the compensation function. The number of bit combinations obtained is $2^M$ and it is constantly reduced compared with the original $2^N$ possibilities. The memory site of the comparison values is not a RAM but the respective comparison value register of a comparator. If for example a bit pattern with N=20 bits were present at the parallel outputs of the shift register, in D1 a RAM with $2^{20}$ storage locations would have to be available, to be read at a high bit rate of currently >40 Gbit. The inventive method means that only 3 comparators would result for a discretization of 8 stages. Also the problem of high read speed is eliminated.

Figure 3:
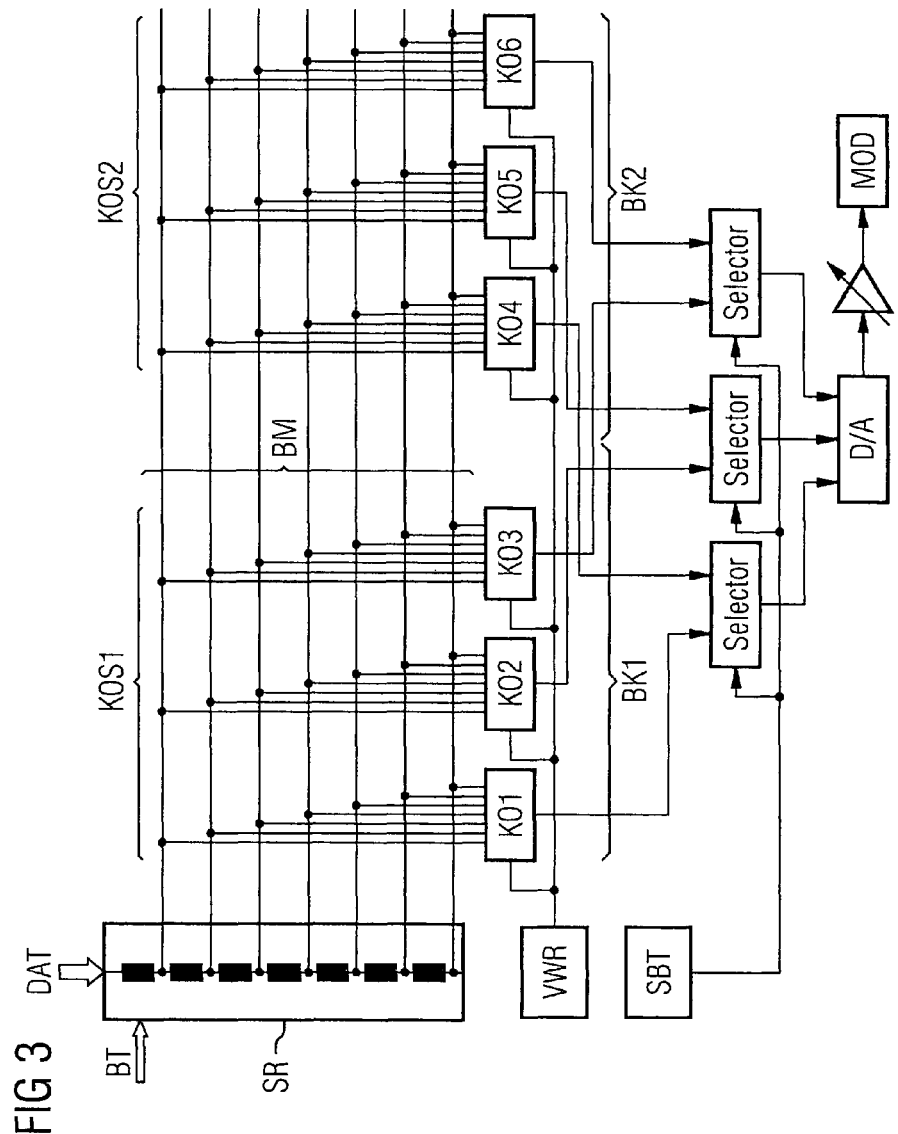
FIG. 3 shows a circuit arrangement according to FIG. 1 with two output values of the compensation signal per bit clock pulse rate

FIG. 3 outlines a circuit arrangement of an electrical pre-emphasizer, which supplies at least two output values for the compensation signal KS per clock pulse interval. To this end a number of comparators are combined to form a comparator set KOS and a number of these comparator sets are connected one behind the other. In the variant shown in FIG. 3 two comparator sets KOS1 and KOS2 are used, in order to generate two output values for the compensation signal KS per bit clock pulse interval BT. To this end a controller SBT switches to and fro between the two comparators at double the bit clock pulse rate. To this end selectors are inserted between the comparators and the D/A converter. This variant or variants with more than 2 output values per clock pulse are particularly expedient for transmission links, in which higher frequency components occur due to non-linearities, as a result of which steep signal edges and clear level variations occur in the transmission signal during a bit period. In this instance an increase in resolution to two or more scan values per bit clock pulse results in a clear improvement in compensation for interference effects.

FIG. 4 shows a circuit arrangement for a general electrical pre-emphasizer, which generates both compensation signals $KS_A$ to control the amplitude of the transmission signal US in the modulator MOD as well as compensation signals $KS_\phi$ to control the phase of the transmission signal US in the modulator MOD. The comparators here are generally replaced by a transcoder circuit, which can for example be programmed. Starting with a data signal DAT pushed bit clock pulse by bit clock pulse through the shift register SR, by corresponding transcoding of the bit pattern BM of length N present at the parallel outputs of the shift register new bit combinations BK of length M are generated, which result after D/A conversion in the analog control signals $KS_A$ and $KS_\phi$ for the modulator. The case-specific programming of the transcoder results from the data and characteristics of the transmission link and its components between the D/A converter and the receiver at the end of the link. In a further variant a number of previously calculated data items, which are assigned to specific dispersion values, are connected to the general transcoder AU.

The same principle can also be applied to electrical signals, if the signals are transmitted both in the baseband and also in modulated form.

The invention claimed is:

1. A method for forming a transmitter-side transmission signal to compensate for the interference caused by transmission characteristics of an optical transmission system, comprising:
   forming a current bit pattern from a data bit to be transmitted and from adjacent bits of an N-stage shift register taken in a parallel manner and at a bit clock pulse rate;
   supplying the current bit pattern to a plurality of comparators;
   supplying an adjustable comparison value generated as a function of a compensation function to the comparators;
   transcoding the current bit pattern; to a bit combination via the comparators according to the comparison value, the current bit pattern transcoded into a bit combination corresponding to a digital value of a compensation signal; and
   converting the bit combination to an analog value of a compensation signal by digital/analog conversion,
   wherein the compensation signal controls a modulator according to the required formation of the transmission signal.

2. The method as claimed in claim 1, wherein the comparison value is determined from an inverse transmission function of the transmission system and possible bit patterns.

3. The method as claimed in claim 1, wherein the comparison value is stored in tables and supplied to the comparators according to the compensation function.

4. The method as claimed in claim 1, wherein the transcoding bit combination consists of M bits, where 1<M<N.

5. The method as claimed in claim 1, further comprising:
   arranging the plurality of comparators in at least two comparator sets such that each set includes a plurality of comparators,
   wherein the supplying the current bit pattern to the plurality of comparators is via the at least two comparator sets, and
   wherein a switching is effected between these comparator sets (KOS1, KOS2, . . .) at a rate at least double the bit clock pulse rate such that at least two temporally successive bit combinations are generated per bit clock pulse interval.

6. The method as claimed in claim 5, wherein the at least two temporally successive bit combinations comprise a first transcoded bit combination and a second transcoded bit combination, wherein the at least two comparator sets comprise a first comparator set and a second comparator set, wherein the first transcoded bit combination is generated in the first comparator set and is used in the modulator to control an amplitude of the transmission signal, and wherein the second transcoded bit combination is generated in the second comparator set and is used in the modulator to control a carrier phase of the transmission signal.

7. The method as claimed in claim 5, wherein each comparator set is supplied a comparison value.

8. A method for the transmit-side formation of a transmission signal to compensate for the interference caused by transmission characteristics of an optical transmission system, comprising:

taking a data bit to be transmitted and adjacent bits from an arrangement with N electronic propagation time elements with adjustable propagation time as a bit pattern at a bit clock pulse rate, the bit pattern taken out in a parallel manner;

supplying the bit pattern to a plurality of comparators;

supplying adjustable comparison values generated as a function of a compensation function; and transcoding the bit pattern via the comparators and according to the comparison values to a bit combination, wherein the bit combination is converted by digital/analog conversion to a value of a compensation signal and the compensation signal controls a modulator according to the required formation of the transmission signal.

9. An arrangement for forming a transmitter-side transmission signal to compensate for the interference caused by transmission characteristics of an optical transmission system, comprising:

an N-stage shift register including a data bit (DA) to be transmitted, adjacent bits to the data bit, and a plurality parallel outputs;

a bit clock pulse rate;

a bit pattern formed by taking the data bit and adjacent bits are from the register at the bit clock pulse rate via the plurality of parallel outputs;

a digital/analog converter that converts a digital input to an analog compensation signal to activate a modulator for the formation of the transmission signal;

a plurality of comparators connected to:

at least one predetermined comparison value register, the parallel outputs in order to receive the bit pattern, and the digital/analog converter, wherein comparisons of the bit pattern with the at least one predetermined comparison value occurs in the comparators and results in transcoding the bit pattern into a bit combination that is fed into the digital/analog converter.

* * * * *